US009164944B2

(12) United States Patent
Yamaguchi et al.

(10) Patent No.: US 9,164,944 B2
(45) Date of Patent: Oct. 20, 2015

(54) SEMICONDUCTOR SYSTEM, RELAY APPARATUS, AND CHIP CIRCUIT

(75) Inventors: Takao Yamaguchi, Osaka (JP); Tomoki Ishii, Kyoto (JP); Atsushi Yoshida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 818 days.

(21) Appl. No.: 13/283,942

(22) Filed: Oct. 28, 2011

(65) Prior Publication Data

US 2012/0044942 A1 Feb. 23, 2012

Related U.S. Application Data

(63) Continuation of application No. PCT/JP2011/000260, filed on Jan. 19, 2011.

(30) Foreign Application Priority Data

Jan. 25, 2010 (JP) ................. 2010-013047

(51) Int. Cl.
H04L 1/00 (2006.01)
G06F 13/40 (2006.01)
G06F 13/16 (2006.01)
H04L 12/721 (2013.01)
(52) U.S. Cl.
CPC ........ *G06F 13/4022* (2013.01); *G06F 13/1663* (2013.01); *H04L 45/123* (2013.01)
(58) Field of Classification Search
USPC ......................................... 370/229–238, 400
See application file for complete search history.

(56) References Cited

U.S. PATENT DOCUMENTS

| 5,255,266 | A | * | 10/1993 | Watanabe et al. | ............. | 370/233 |
| 5,550,748 | A | * | 8/1996 | Xiong | ............ | 716/129 |
| 5,935,232 | A | * | 8/1999 | Lambrecht et al. | ........... | 710/315 |
| 5,959,995 | A | | 9/1999 | Wicki et al. | | |
| 6,556,541 | B1 | * | 4/2003 | Bare | .............. | 370/235 |

(Continued)

FOREIGN PATENT DOCUMENTS

| CN | 101484880 A | 7/2009 |
| JP | 10-254775 A | 9/1998 |

(Continued)

OTHER PUBLICATIONS

International Search Report for corresponding International Application No. PCT/JP2011/000260 mailed Apr. 26, 2011.

(Continued)

*Primary Examiner* — Phuc Tran
(74) *Attorney, Agent, or Firm* — Renner, Otto, Boisselle & Sklar, LLP

(57) ABSTRACT

Highly efficient and low latency network transmission in consideration of a difference in the traffic characteristic and a memory access load which changes moment by moment is realized. A relay device transmits data on a networked communication bus between a bus master and a memory. The relay device includes a delay time processor for obtaining information on processing delay time in other relay devices located on a plurality of transmission routes on which the data is transmitted; and a low latency route selector for selecting a memory and one of transmission routes to the memory, among the plurality of transmission routes, based on obtained information on the processing delay time regarding the plurality of transmission routes.

6 Claims, 16 Drawing Sheets

(56) References Cited

U.S. PATENT DOCUMENTS

| | | | |
|---|---|---|---|
| 8,102,761 B2* | 1/2012 | Yamaguchi et al. | 370/225 |
| 2003/0048750 A1* | 3/2003 | Kobayashi | 370/229 |
| 2004/0017807 A1* | 1/2004 | Dorr et al. | 370/389 |
| 2005/0086363 A1* | 4/2005 | Ji | 709/235 |
| 2007/0195748 A1 | 8/2007 | Radulescu | |
| 2007/0230479 A1* | 10/2007 | Liu | 370/395.52 |
| 2007/0253410 A1 | 11/2007 | Dielissen | |
| 2008/0219168 A1* | 9/2008 | Enomoto et al. | 370/237 |
| 2009/0198957 A1* | 8/2009 | Arimilli et al. | 712/29 |
| 2009/0198958 A1* | 8/2009 | Arimilli et al. | 712/29 |
| 2009/0213970 A1* | 8/2009 | Kubo | 375/356 |
| 2009/0252102 A1* | 10/2009 | Seidel et al. | 370/329 |
| 2010/0002589 A1 | 1/2010 | Ciordas et al. | |
| 2010/0211718 A1* | 8/2010 | Gratz et al. | 710/317 |
| 2010/0211756 A1* | 8/2010 | Kaminski et al. | 711/172 |
| 2011/0060831 A1* | 3/2011 | Ishii et al. | 709/224 |

FOREIGN PATENT DOCUMENTS

| | | |
|---|---|---|
| JP | 2002-247087 A | 8/2002 |
| JP | 3816531 B | 6/2006 |
| JP | 2007-104677 A | 4/2007 |
| JP | 2007-528177 A | 10/2007 |
| JP | 2007-532075 A | 11/2007 |
| WO | 2009/150849 A1 | 12/2009 |

OTHER PUBLICATIONS

Matsutani et al., "Evaluations of Prediction Router for Low-Latency On-Chip Networks", IPSJ SIG Technical Reports, Jan. 13, 2009, pp. 1-6 and Abstract.

John Kim, "Low-Cost Router Microarchitecture for On-Chip Networks", MICRO '09, Dec. 2009, pp. 255-266.

Dobkin et al., "QNoC asynchronous router", Integration, the VLSI journal 42 (2009), pp. 103-115.

Matsutani et al., "Rearrangeable NoC: A Distributed Router Architecture for Exploiting Wire Delay", IPSJ SIG Technical Reports 2008-ARC-180, pp. 57-62, Oct. 2008 concise explanation.

Chinese Office Action including Search Report (with English translation) for corresponding Chinese Application No. 201180002567.7 dated Mar. 24, 2014.

* cited by examiner

| FLOW ID | TYPE OF DATA | LOW LATENCY REQUEST | AMPLITUDE |
|---------|--------------|---------------------|-----------|
| A | CONTROL DATA | 1 ↑ | ±5% |
| B | AUDIO DATA | 2  HIGH | ±10% |
| C | VIDEO DATA | 3 | ±30% |
| ⋮ | ⋮ | ⋮ | ⋮ |

FIG.13

```
PROCESSING PROCEDURE IN S805
         ↓
S901  COLLECT THE FOLLOWING INFORMATION BY MEANS OF THE LOW LATENCY
      ROUTE SELECTOR
      * NUMBER OF RELAY STAGES (H) TO THE TARGET MEMORY
      * DATA LENGTH (L) OF THE DATA AS THE TRANSMISSION TARGET
S902  * DELAY TIME (D) OF THE TRAFFIC FOR WHICH LOW LATENCY IS REQUESTED
         ↓
      PERFORM A CALCULATION FOR ROUTE SELECTION (EVALUATION EXPRESSION =
      H × L × D) AND DETERMINE THE TRANSFER DESTINATION BASED ON THE ROUTE
      INFORMATION BY MEANS OF THE LOW LATENCY ROUTE SELECTOR
         ↓
        END
```

FIG.14

| NUMBER OF RELAY STAGES (H) | DATA LENGTH (L) | DELAY TIME (D) | EVALUATION VALUE | |
|---|---|---|---|---|
| 2 | 2 | 1 | 4 | (1) |
| 4 | 2 | 1 | 8 | |
| 2 | 2 | 1 | 4 | (2) |
| 2 | 4 | 1 | 8 | |
| 2 | 2 | 2 | 8 | (3) |
| 2 | 2 | 4 | 16 | |

FIG.16
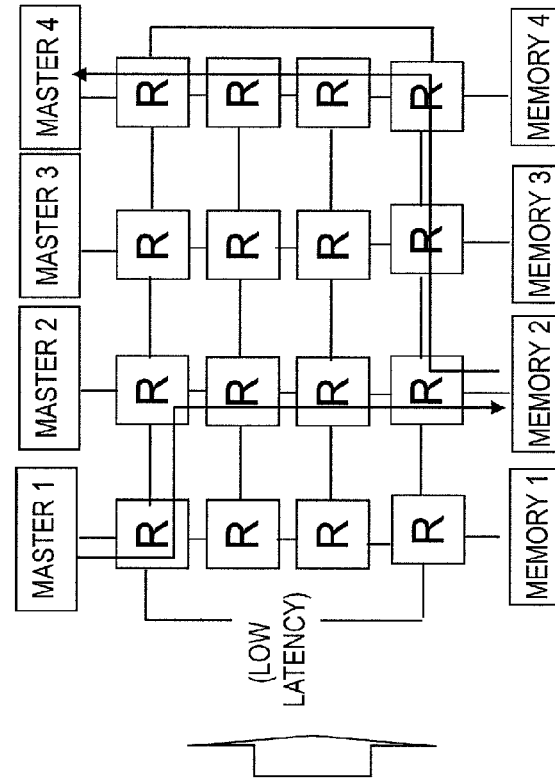
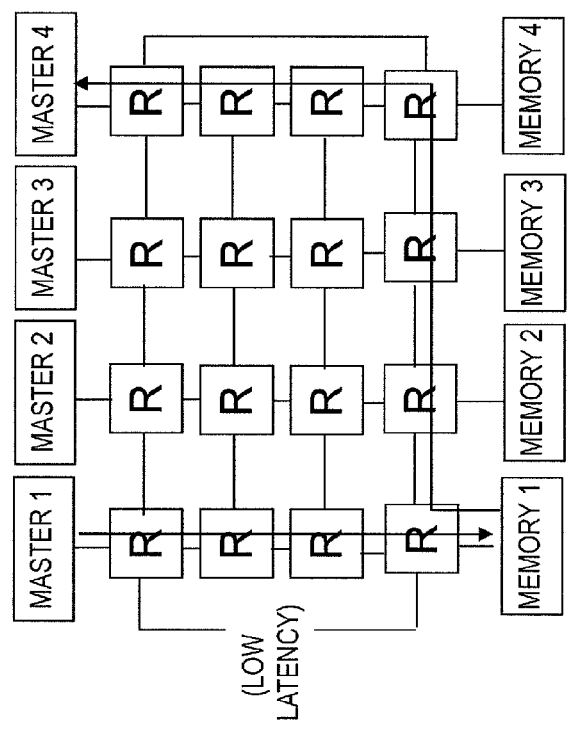

SEMICONDUCTOR SYSTEM, RELAY APPARATUS, AND CHIP CIRCUIT

This is a continuation of International Application No. PCT/JP2011/000260, with an international filing date of Jan. 19, 2011, which claims priority of Japanese Patent Application No. 2010-013047, filed on Jan. 25, 2010, the contents of which are hereby incorporated by reference.

BACKGROUND OF THE INVENTION

1. Field of the Invention

The present invention relates to a low latency transmission device, method and program in a semiconductor system for realizing decentralization of memory access loads.

2. Description of the Related Art

Conventionally, in order to decentralize memory access loads in a semiconductor chip circuit, a semiconductor system circuit having a hierarchical memory which includes organically combined memories of different access speeds has been proposed in consideration of both of the cost and the processing performance. Especially in order to solve the problem that load are centralized in a bus, research and development has been performed for decentralizing traffics into a plurality of transmission routes by means of a network in a semiconductor chip circuit, i.e., a network on chip (hereinafter in this specification, referred to as the "NoC").

In this specification, a semiconductor system in which an NoC is used to decentralize buses and a plurality of rewritable memories such as DRAMs, SRAMs or the like are connected to the NoC is assumed.

In order to realize decentralization of memory access loads which can follow requests for memory access changing moment by moment in such a semiconductor system, it is necessary to determine both of a memory on which data is to be stored and a transmission route from a bus master (e.g., CPU or DSP) to the memory. Conventionally, technologies for allowing the bus master to select an optimum memory and technologies for selecting the transmission route have been developed separately.

One conventional method for determining the memory on which the data is to be stored is a round robin method, by which processing is assigned sequentially in the order of requests. As a method for determining the transmission route from the bus master to the memory, an efficient method of transmission on a network on chip has been proposed. Specifically, since the transmission routes are networked by use of relay devices (routers), a plurality of transmission routes can be selected for use. Therefore, technologies for efficiently using a plurality of routes to solve the problem of crowding of a bus have been published.

For example, Japanese Patent No. 3816531 discloses a technology for selecting routes for transmission on a network of mutually connected multiprocessors. According to the technology described in Japanese Patent No. 3816531, it is assumed that a plurality of routes can be selected. When there is no response within a certain time period on a route on which a packet has been transmitted, one of a plurality of predefined routes is selected in conformity to the distribution of pre-defined selection probability for each route, and thus the packet is re-transmitted. Namely, according to this technology, a transmission route is selected based on the result of monitoring the transmission quality of the routes on a network on a semiconductor system.

According to the conventional technologies, it is attempted to improve the transmission efficiency by adjusting the memory on which the data is to be stored and the transmission route from the bus master to the memory separately. In the future, more efficient and low latency network transmission needs to be realized. According to the conventional technologies, no transmission method has been considered in the case where requested transmission delay characteristics are different traffic by traffic.

Specifically, the conventional method for determining the memory on which the data is to be stored is a round robin method, and therefore the memory on which the data is to be stored is not assigned in accordance with the memory access load changing moment by moment. In the case of, for example, video data, the code amount of which is significantly changed in terms of time in accordance with the contents, the access load is significantly different among the memories to which the data is assigned and thus the decentralization of memory access loads does not effectively function.

On a network of a network on chip, a traffic for which low latency transmission is requested, and also a traffic for which low latency transmission is not requested, are both existent. For example, processing for which high responsiveness is needed, such as a user operation, and a traffic for which responsiveness is not needed, such as depiction of a background, are both existent. In the case where such traffics are existent on the same network, the traffic for which the request level for low latency is low influences the traffic for which the request level for low latency is high due to mutual interference of the traffics. Therefore, a method for determining a memory on which the data is to be stored and a transmission route, in consideration of the difference in the traffic characteristic (in the above example, traffic rate or request level for low latency) is needed.

The present invention has an object of realizing a more efficient and low latency network transmission in consideration of the difference in the traffic characteristics and the memory access loads changing moment by moment.

SUMMARY OF THE INVENTION

A semiconductor system according to the present invention includes at least one first node; a plurality of second nodes; and a relay device for relaying data transmitted from the at least one first node via a networked communication bus and transmitting the data to one of the plurality of second nodes. The relay device is connected to the at least one first node; the relay device includes a low latency route selector for selecting a set of a second node and a transmission route from combinations of each of the plurality of second nodes and each of a plurality of transmission routes, based on information on a load value of each of the second nodes and information on a load value of each of the transmission routes; and the relay device uses the transmission route selected by the low latency route selector to relay the data toward the selected second node.

The low latency route selector may use at least one of a buffer amount, latency of a packet, throughput and jitter of a relay device immediately before each of the second nodes as the load value of each of the second nodes.

The low latency route selector may use at least one of the number of relay stages, a data length, a bus width and a bus band, as the load value of each of the transmission routes.

The low latency route selector may select the second node and the transmission route for which a sum of an evaluation value of a forward path between the at least one first node and the second node and an evaluation value of a return path between the at least one first node and the second node is smallest.

The low latency route selector may assemble traffics having a drastic change of peak or generated in a single, independent manner to one, same transmission route or second node with priority.

The plurality of second nodes may include at least one of a memory, a processor, and a digital signal processor.

The plurality of second nodes may include a relay device for connecting a plurality of networks.

A relay device according to the present invention is a relay device for transmitting data on a networked communication bus between a bus master and a memory. The relay device includes a delay time processor for obtaining information on processing delay time in other relay devices located on a plurality of transmission routes on which the data is transmitted; and a low latency route selector for selecting a memory and one of transmission routes to the memory, among the plurality of transmission routes, based on obtained information on the processing delay time regarding the plurality of transmission routes.

The low latency route selector may select, among a plurality of types of memories of different access speeds, a memory of a relatively high access speed, and may select a transmission route having a shortest delay time to the selected memory.

When information representing a request level for low latency of the data represents a level not exceeding a predefined delay time, the low latency route selector may select a memory of a relatively high access speed and a transmission route having a shortest delay time to the selected memory, based on information on at least one of an amplitude, a packet size, a data size, and a transmission interval of a traffic flowing in each of the plurality of transmission routes.

The low latency route selector may select, among the plurality of types of memories, a memory of a relatively low access speed, and may select a transmission route to the selected memory based on a magnitude of at least one of an amplitude, a packet size, a data size, and a transmission interval of a traffic on each of the transmission routes to the memory.

The relay device may further include a receiver for receiving the data; and a transmitter for transmitting the information on the processing delay time. When the relay device is connected to any one of the plurality of types of memories, the delay time processor may transfer the information on the processing delay time in the receiver to another relay device via the transmitter.

The relay device may further include a receiver for receiving the information on the processing delay time. When the relay device is connected to the bus master, the delay time processor may collect the information on the processing delay time in the another relay device via the receiver.

The low latency route selector may select a memory and one of transmission routes to the memory, among the plurality of transmission routes, in accordance with an evaluation value generated by use of at least one of delay time of a traffic for which low latency is requested, the number of relay stages and a data length in transmission units.

The low latency route selector may select a memory and a transmission route for which a sum of an evaluation value of a forward path between the bus master and the memory and an evaluation value of a return path between the bus master and the same the memory is smallest.

When data is transmitted between the same pair of bus masters, the low latency route selector may select the same memory and transmission route.

The low latency route selector may select the same memory and the same transmission route in accordance with whether or not traffics have a changing peak and in accordance with whether or not traffic are generated in a single, independent manner.

When information representing a request level for low latency represents a level equal to or higher than a predefined delay time, the delay time processor may obtain information on processing delay time of the plurality of transmission routes.

A chip circuit according to the present invention includes at least one bus master; at least one memory; and a plurality of the relay device described in any one of the above and provided on a networked communication bus between the at least one master and the at least one memory.

When a plurality of pieces of application software are executed by use of the at least one bus master, the low latency route selector may select one of the at least one memory and one of a plurality of transmission routes which are to be used by each of the plurality of pieces of application software.

In a semiconductor system for realizing decentralization of memory access loads, highly efficient and low latency network transmission is made possible.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 13 is a flowchart showing the processing procedure in step S805 shown in FIG. 12 in detail.

FIG. 14 shows a specific example of evaluation values usable as reference for selecting a memory and a route.

FIGS. 16(A) and 16(B) each show an example of processing of determining a memory and a route in comprehensive consideration of evaluation values of a forward path and a return path.

DETAILED DESCRIPTION OF PREFERRED EMBODIMENTS

Hereinafter, a low latency transmission device and a low latency transmission method in an embodiment according to the present invention will be described with reference to the attached drawings.

Figure 1A:
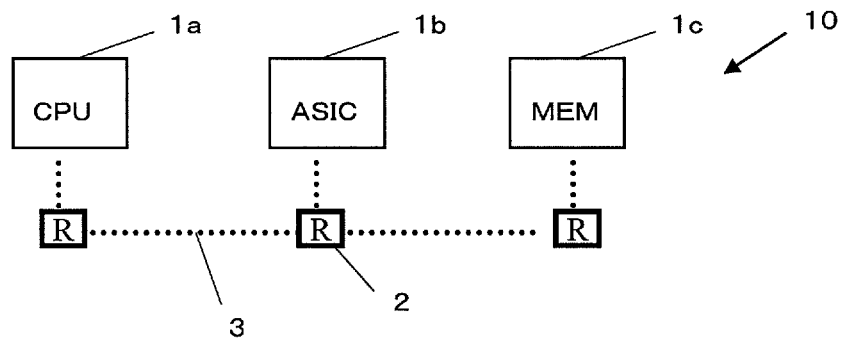
FIG. 1A shows an example of structure of hardware connection.
Figure 1B:
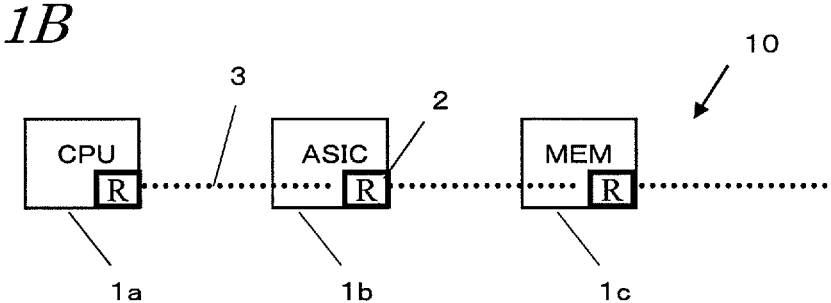
FIG. 1B is a schematic view thereof.

FIGS. 1A and 1B show a structure of a part of an NoC. FIG. 1A shows an example of structure of hardware connection, and FIG. 1B is a schematic view thereof. FIGS. 1A and 1B show that bus masters $1a$ through $1c$ provided on a chip 10 are each connected to a bus 3 via a respective relay device (R) 2.

Figure 2:
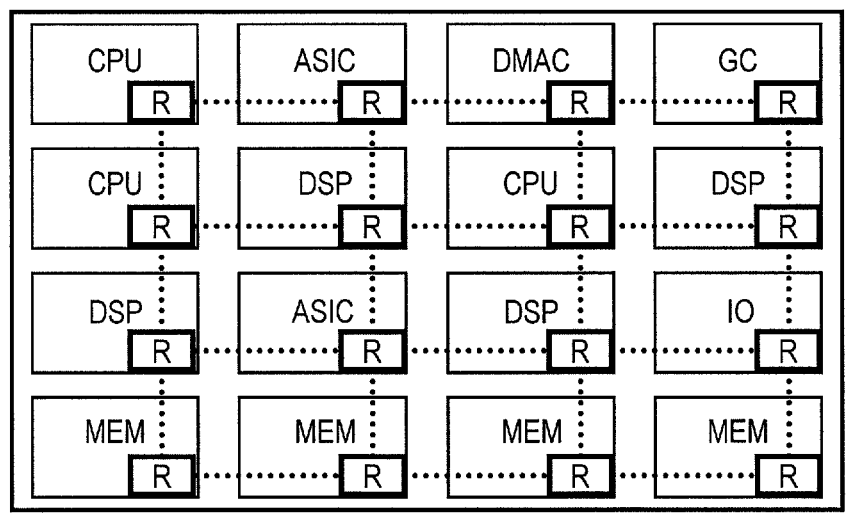
FIG. 2 shows an example of structure of an NoC in which bus masters are connected to each other in a two-dimensional mesh.

FIG. 2 shows an example of structure of a general NoC for which bus masters are connected to each other in a two-dimensional mesh. A relay device R for controlling a data transmission route is located for each of bus masters such as microprocessors, digital signal processors (DSPs), memories, input/output circuits and the like. The bus control devices R are connected (linked) to each other by a short line.

Now, a configuration of a semiconductor system having an NoC bus assumed in an embodiment according to the present invention will be described.

Figure 3:
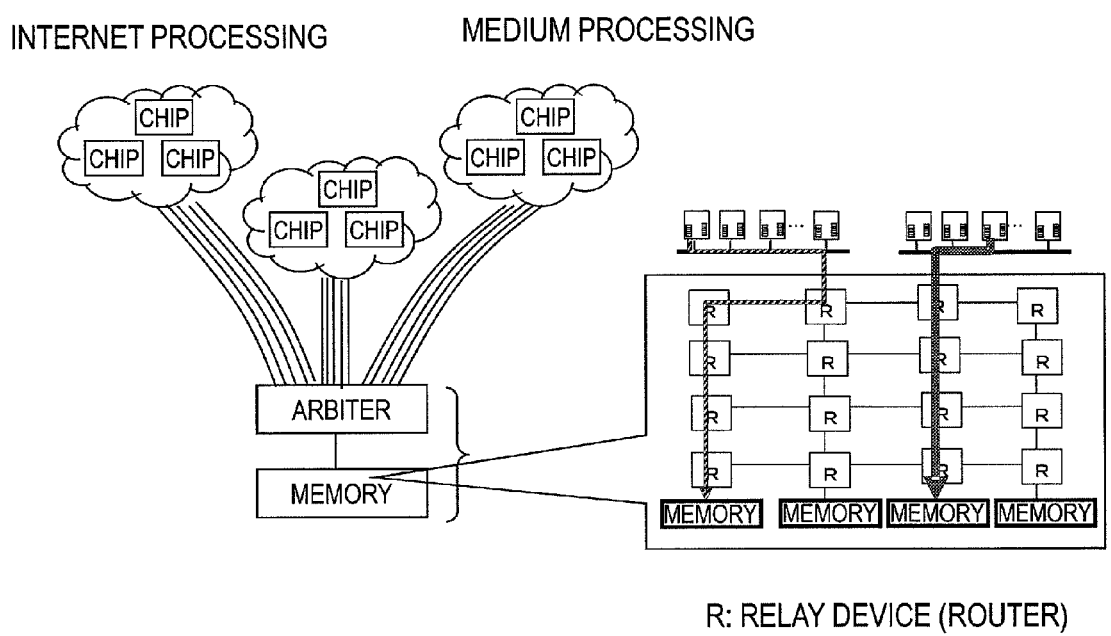
FIG. 3 is a schematic view of an example of NoC in which transmission routes are controlled in accordance with a route control method in Embodiment 1 according to the present invention.

FIG. 3 schematically shows an example of NoC in which transmission routes are controlled in accordance with a route control method in this embodiment. In the system shown in FIG. 3, a plurality of chips access memories via an arbiter. The arbiter has an NoC therein. The NoC is used to decentralize the accesses to the plurality of memories, and thus the NoC can be operated at a low operation clock without the bus loads being centralized. In the example shown in the figure, there are two types of traffics, one for Internet processing and the other for medium processing. A transmission delay is caused by interference of the traffics.

Specifically, in the case where a bus of a TV or a mobile phone having a built-in Internet function is formed of a network on chip, a traffic for which low latency transmission is requested, and a traffic for which low latency transmission is not requested on the network of the network on chip, are both existent. An example of transmission for which the request level for low latency is high is for processing requiring high responsiveness, such as a user operation made to switch TV channels. An example of transmission for which the request level for low latency is low is for a traffic for which responsiveness is not needed, such as depiction of a background in contents display on the Internet. In the case where these traffics are existent on the same network, the traffic for which the request level for low latency is low influences the traffic for which the request level for low latency is high due to mutual interference of the traffics.

In this embodiment, transmissions different in the traffic characteristic are assumed. The traffic characteristic is, for example, the traffic rate, the packet size of each application, the number of traffic flows, or the degree of low latency required by the application (request level for low latency). In a semiconductor system in which a plurality of bus masters such as DSPs, CPUs and the like and a plurality of rewritable memories such as DRAMs, SRAMs and the like are connected to an NoC, uses in which the bus masters connected to the NoC dynamically select a route having a low transmission load and a memory having a low access load are assumed.

The NoC in this embodiment may adopt a communication method by which a transmission slot of a prescribed time length is provided and target information is transmitted in synchronization with the transmission slot, or a communication method by which the target information is transmitted asynchronously. It is assumed that relay devices do not dispose of packets and the packets are maintained until the transmission is made possible. Flow control may be introduced to adjust the intervals between the packets to be transmitted. In this embodiment, the unit of the data to be transmitted (transmission unit) is referred to as the "packet" or "flit". Specific structures thereof will be described later.

Figure 4:
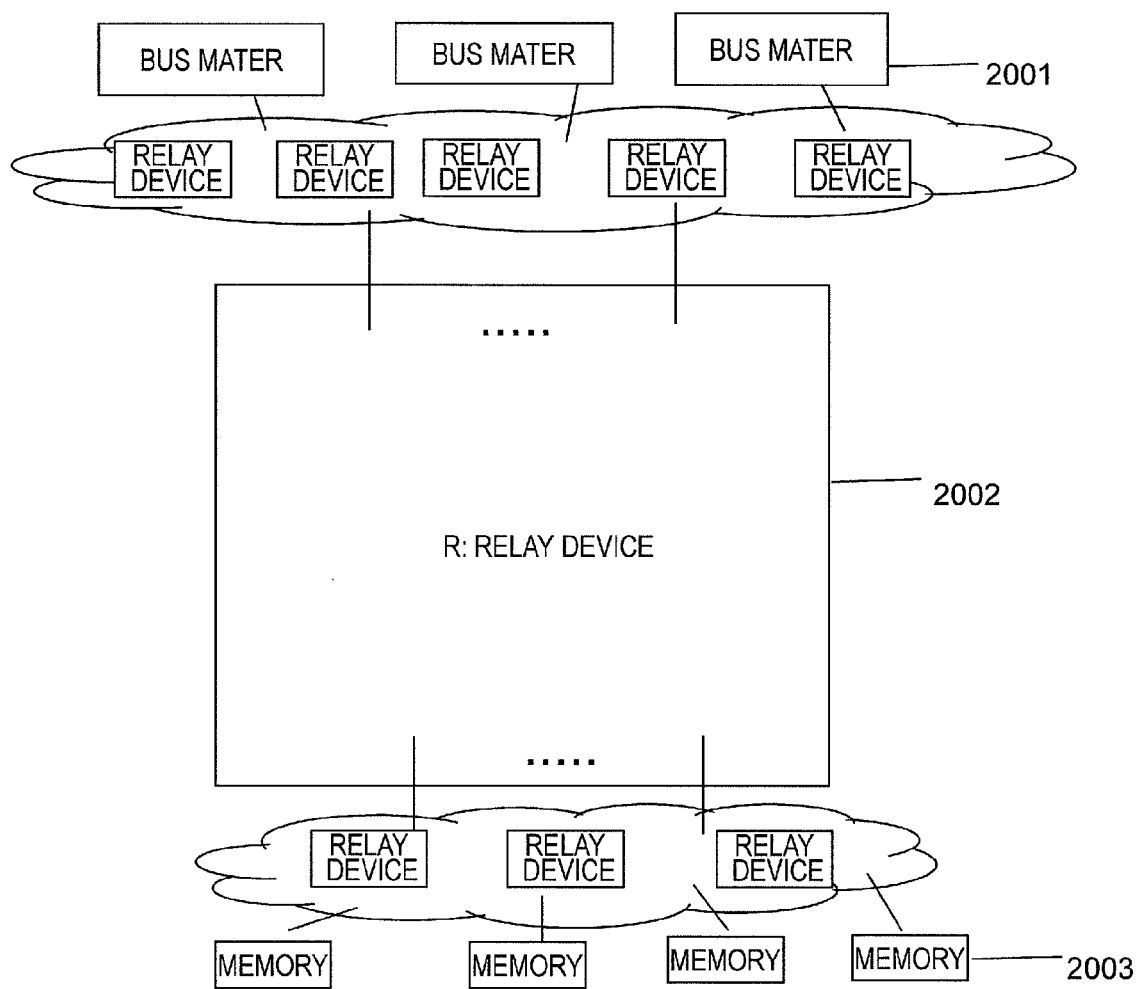
FIG. 4 shows a structure of connection of relay devices.
Figure 5:
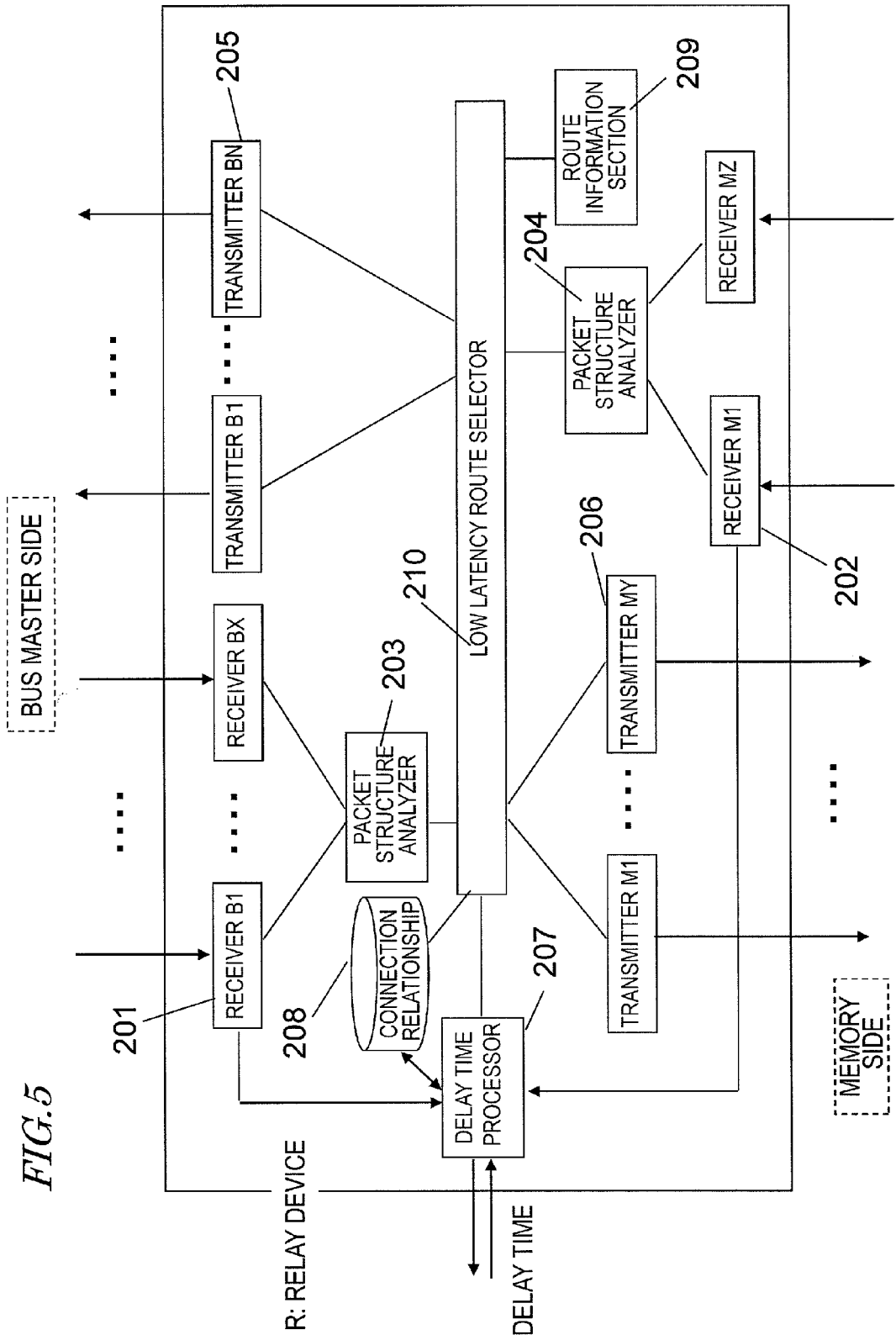
FIG. 5 is a block diagram showing a structure of a relay device.

FIG. 4 and FIG. 5 show a structure of a relay device.

FIG. 4 shows a connection relationship between a plurality of bus masters 2001, a plurality of relay devices 2002 and a plurality of memories 2003. In conformity to a request from each bus master 2001 (e.g., DSP, CPU, IO, etc.), an appropriate memory among the plurality of memories 2003 is accessed via the plurality of stages of relay devices 2002. In order to decentralize the traffic loads, the plurality of relay devices 2002 are connected in a multiple stages. Thus, the crowding on the transmission routes is suppressed. The plurality of memories 2003 are prepared so that accesses are not centralized to one or a small number of memories. Thus, the access loads to the memories are alleviated.

FIG. 5 shows an example of internal structure of a relay device. According to this structure, transmission from the bus master to the memory and transmission from the memory to the bus master are independently controlled.

The relay device includes receivers 201 and 202 and transmitters 205 and 206. The receivers (B1, . . . BX) 201 receive instructions and data sequences from other relay devices or bus masters. The receivers (M1, . . . MZ) 202 receive instructions and data sequences from other relay devices or memories. The transmitters (B1, . . . BN) 205 and the transmitters (M1, . . . MY) 206 transmit instructions and data sequences to a determined receiving end (another relay device or a memory).

Two systems of receiving devices are provided so that traffics from a plurality of relay devices or bus masters can be processed at the same time. Two systems of sending devices are provided so that traffics from a plurality of relay devices or memories can be processed at the same time. At least one of the receivers and the transmitters may be provided in at least three systems, or one or both of the receivers and the transmitters may be provided in one system.

According to the structure shown in the figure, a receiving buffer (not shown) is provided for each destination (bus master side or memory side) so that access requests from the bus masters and the requests from the memories can be processed at the same time.

The relay device further includes a packet structure analyzer 203 (or packet structure analyzer 204), a delay time processor 207, a connection relationship database 208, a route information section 209, and a low latency route selector 210.

The packet structure analyzer 203 (or packet structure analyzer 204) analyzes the structure of a received packet and determines whether or not to request low latency transmission.

The delay time processor 207 refers to the connection relationship database 208 including information which represents the connection relationship regarding the relay device to determine whether to collect or transmit the delay time of the traffic. More specifically, the delay time processor 207 receives information on a receiving situation from another device located on the bus master side or from a bus master via the receiver 201. The information on the receiving situation represents, for example, a buffer amount in the receiver or the remaining time of the packet. The delay time processor 207 transmits the information on the receiving situation to another relay device or to a memory via the transmitter 206. The delay time processor 207 also receives information on the receiving information from another relay device located on the memory side or from a memory via the receiver 202, and transmits the information to another relay device or a bus master via the transmitter 205.

The route information section 209 manages route information. The low latency route selector 210 determines a relay device or a memory which is to be the receiving end.

Figure 6:
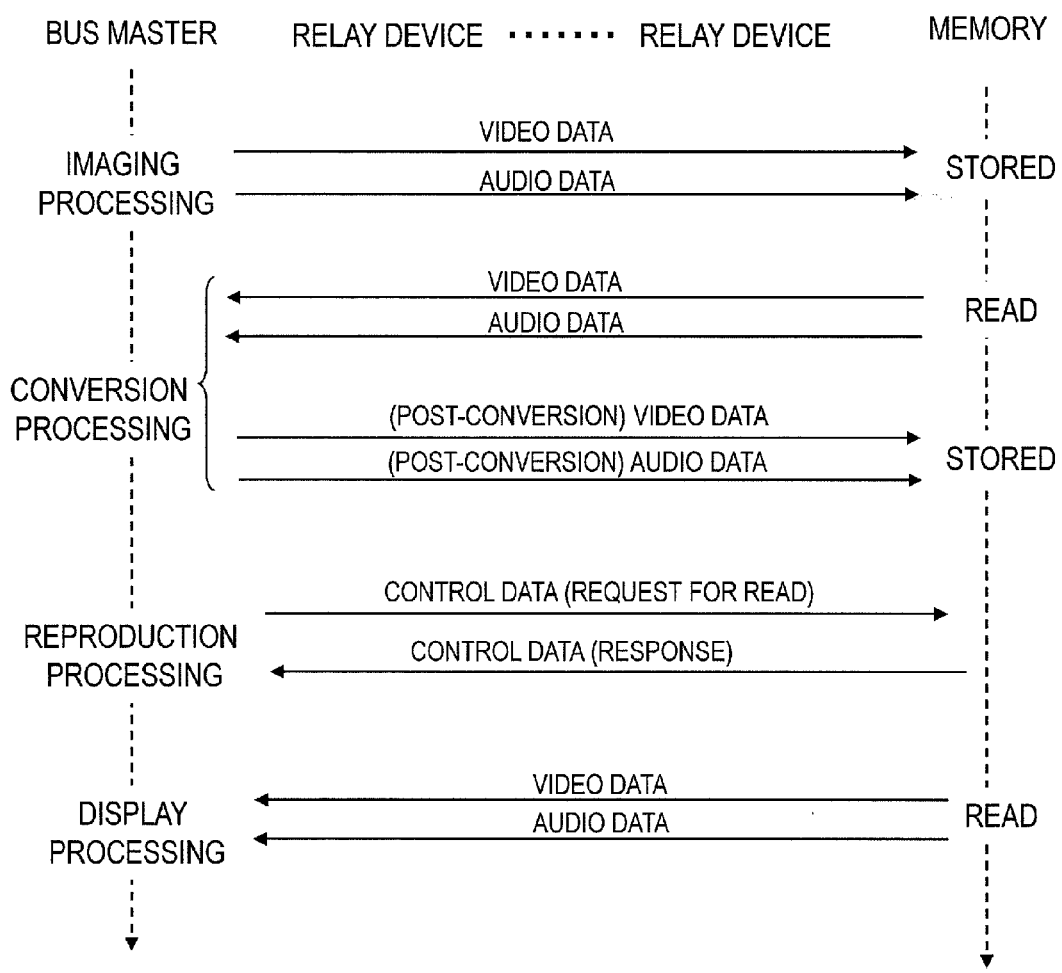
FIG. 6 shows an example of operation of a memory performed in relation with various processing of the bus master and an example of data sent and received between the bus master and the memory via the relay devices.

FIG. 6 shows an example of operation of the memory performed in relation with various processing of the bus master and an example of data transmitted and received between the bus master and the memory via the relay devices.

For example, by imaging processing performed by the bus master, video data and audio data are transmitted to, and stored on, the memory. By conversion processing, video data and audio data are read from the memory and converted by the bus master. The video data and the audio data converted by the bus master are transmitted to, and stored on, the memory.

Figure 7:
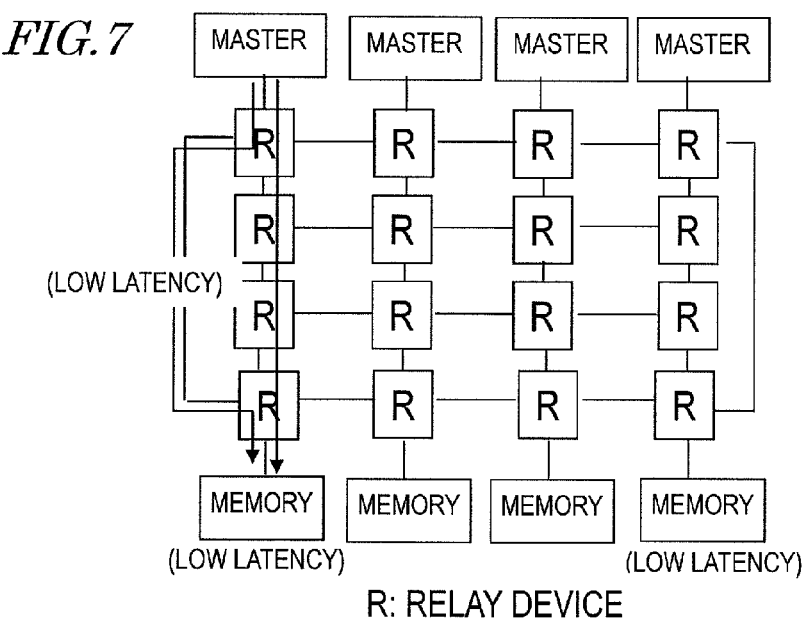
FIG. 7 shows a network configuration of an NoC for realizing low latency transmission.

FIG. 7 shows a network configuration of an NoC for realizing low latency transmission. In the example shown in the figure, a route bypassing the relay processing and a normal route not bypassing the relay processing are distinguished from each other. Memories accommodating only a traffic for which the request level for low latency is high and other memories are shown as being distinguished from each other. For example, as a memory accommodating only a traffic for which the request level for low latency is higher than a predefined level, a physically high-speed memory such as an SRAM or the like may be used. As a memory accommodating a traffic for which the request level for low latency is not higher than the predefined level, a memory other than the above-mentioned physically high-speed memory (e.g., a relatively low-speed memory such as a DRAM or the like) may be used. A method for selecting a bypassing route and a method for selecting a memory accommodating a traffic for which the request level for low latency is high will be described later in detail. The manner of setting the bypassing route is not limited to the example shown in the figure, and a bypassing route may be set in all the relay devices. It is not absolutely necessary to set a memory for which low latency is requested.

Figure 8:
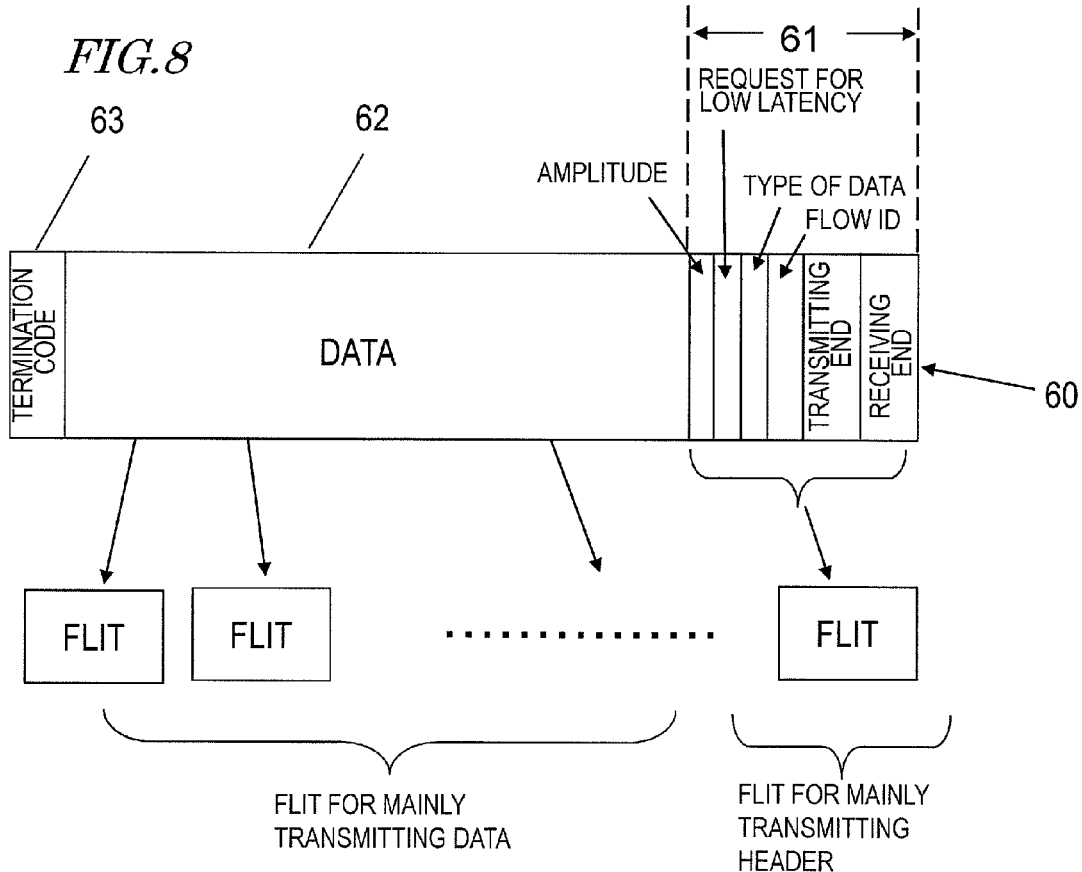
FIG. 8 shows an example of transmission format of a packet 60 and an example of division of the packet 60 into a plurality of flits.

FIG. 8 shows an example of transmission format of a packet 60 and an example of division of the packet 60 into a plurality of flits.

The packet 60 includes a header field 61, a data field 62 and a control code field 63.

In the header field 61, information representing the address of the receiving end, the address of the transmitting end, a flow ID, the type of data, the request level for low latency (type of request for low latency), and the amplitude is described sequentially from the right of the figure. The type of request for low latency may be described by any description method, and may be represented by multi-values. For example, a high numerical value is assigned to processing of user interface for which the request level for low latency is high and high responsiveness is needed, whereas a low numerical value is assigned to video transcode processing for which the request level for low latency is low and which can be dealt with by background processing. After such information, data to be transmitted is described.

In the data field 62, for example, video data and audio data are described. In the control code field 63, for example, a predefined termination code for the packet 60 is described.

Based on the address of the receiving end and the address of the transmitting end, among the data described in the header field 61, relay processing of the packet and receiving processing of the packet on the receiving side are performed. Based on the type of request for low latency, the transmission route is determined.

The bus master on the transmission side transmits the packet in the state of being divided into small packet units called "flits". The memory on the receiving side re-constructs the transmitted flits into a packet based on the termination code. As shown in the example of the figure, the length of the flit may be determined based on the length with which the control data can be described, for example, based on the length of a field in which the address of the receiving end, the address of the transmitting end, and the type of request for low latency are described.

For example, the size of 1 packet is 128 bytes, and the size of 1 flit is 32 bits or 64 bits. It should be noted that the size of 1 packet and the size of 1 flit may vary in accordance with the application, and therefore each of the above-mentioned sizes is merely an example.

Figures 9, 10:
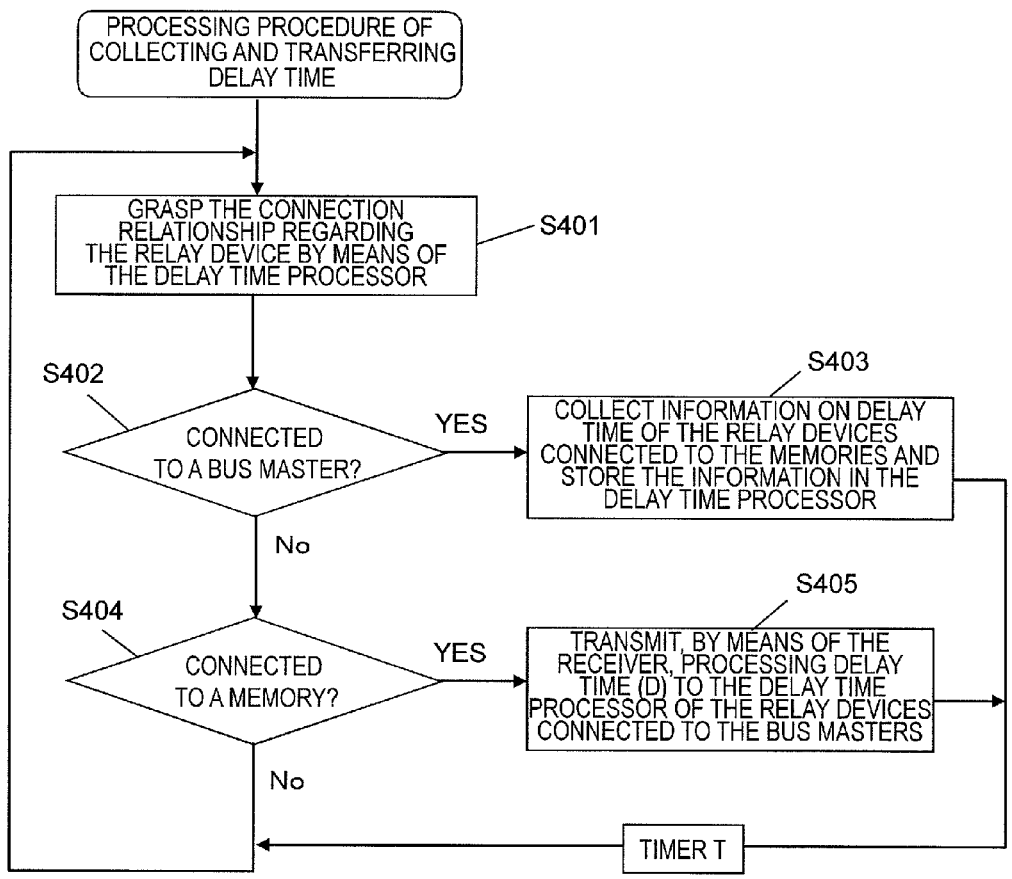
FIG. 9 illustrates an example of characteristics of flows on an NoC.
FIG. 10 is a flowchart showing a processing procedure of collecting and transferring delay time.

FIG. 9 shows an example of characteristics of the flows (traffics) on any NoC.

IDs for identification of flows, an item for identification of the type of data, an item showing the request level for low latency (in the example of the figure, the request level is higher as the numerical value is lower), and an item showing a traffic characteristic are prepared. In this embodiment, the amplitude of the traffic is adopted as the traffic characteristic. The "amplitude of the traffic" indicates a time-wise fluctuation width of the magnitude of the traffic amount, and shows how much the traffic amount is shifted with respect to the average amplitude (traffic amount). For example, "±30%" means that there is a shift of ±30% with respect to the average amplitude. As this numerical value is higher, the load fluctuation of the traffic is larger.

The above-mentioned information on the type of data, the request level for low latency transmission, and the amplitude of the traffic may be grasped in advance by an evaluation of the traffic assumed at the time of designing of the semiconductor system. Realistically, such information may be collected via each of the relay devices during the operation of the semiconductor system, considering that a traffic which cannot be estimated at the time of designing of the semiconductor system such as a user operation occurs. Based on the characteristic of the flows, a transmission route and a memory are selected by a method described later.

FIG. 10 is a flowchart showing a processing procedure of collecting and transferring delay time.

In step S401, the delay time processor 207 refers to the connection relationship database 208 to grasp the connection relationship regarding the relay device. In step S402, the delay time processor 207 determines whether or not the relay device to which the delay time processor 207 belongs (hereinafter, referred to as the "self relay device") is connected to a bus master. When the self relay device is connected to a bus master, the processing advances to step S403; whereas when the self relay device is not connected to a bus master, the processing advances to step S404. In step S403, the delay time processor 207 collects information on delay time in all the relay devices directly connected to the memories and stores the information inside.

In step S404, the delay time processor 207 determines whether or not the self relay device is connected to a memory. When the self relay device is connected to a memory, the processing advances to step S405; whereas when the self relay device is not connected to a memory, the processing returns to step S401.

In step S405, the delay time processor 207 transmits information on processing delay time in the receiver 201 of the self relay device to all the relay devices directly connected to the bus masters. The receiving end is an address of a router which made an inquiry or a predefined address. The relay devices connected to the bus masters each determine a transmission route and a memory based on the obtained delay time.

The information on the delay time may be transmitted periodically from the relay device(s) connected to the bus masters or memories, or transmitted as a response from the above-described relay device to a request transmitted from the delay time processor 207. The information on the delay time may be represented by the residence time of the data in the receiver 201 or by the number of packets processed per unit time.

The route is uniquely determined as follows. Routing which is common in NoCs such as dimension-order routing or the like is implemented, or the structure of the network (e.g., butterfly) for uniquely determining the transmission route to the memory is defined at the time of designing. Thus, a memory as the receiving end is selected. The collection of the information on the delay time of the relay devices connected to the memories mainly allows the memory access load to be collected.

The above-described transmission delay may be made on a route from the bus master to the memory. In addition to the information on the delay time, the value of the amplitude may also be collected.

So far, the method for collecting the delay time based on the receiving states of the receivers 201 of the relay devices connected immediately before the memories at the time of data transmission from the bus master to the memory has been described. By a request for data transmission from the bus master to the memory, the delay time is collected based on the receiving states of the receivers 202 of the relay devices connected immediately before the memories at the time of data transmission from the memory to the bus master. Owing to this, a memory and a transmission route can be selected by use of the delay time for the return path from the memory to the bus master in addition to the forward path from the bus master to the memory. A specific method for selection will be described later. The description will be made mainly on the forward path for data transmission from the memory to the bus master, but the same method is applicable to the return path from the memory to the bus master.

The method for selecting a memory and a transmission route, in consideration of the transmission delay caused in the relay device, will be described later in detail with reference to FIG. 13.

Figure 11B:
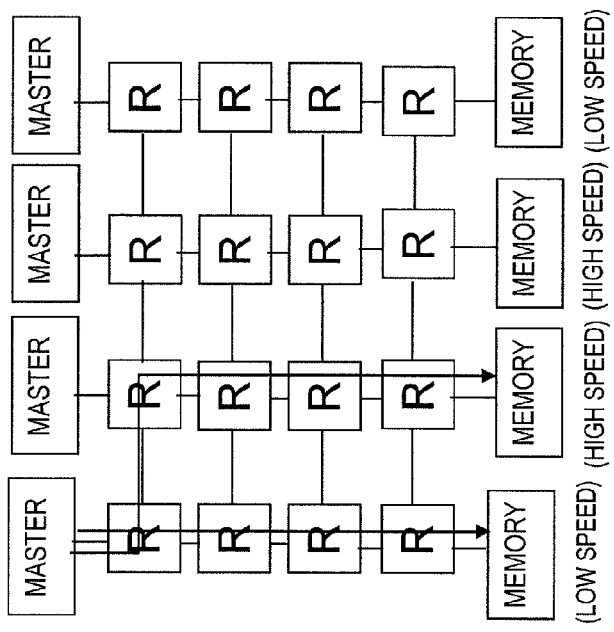
FIGS. 11A and 11B each show a structure of an NoC for realizing low latency transmission.
Figure 11A:
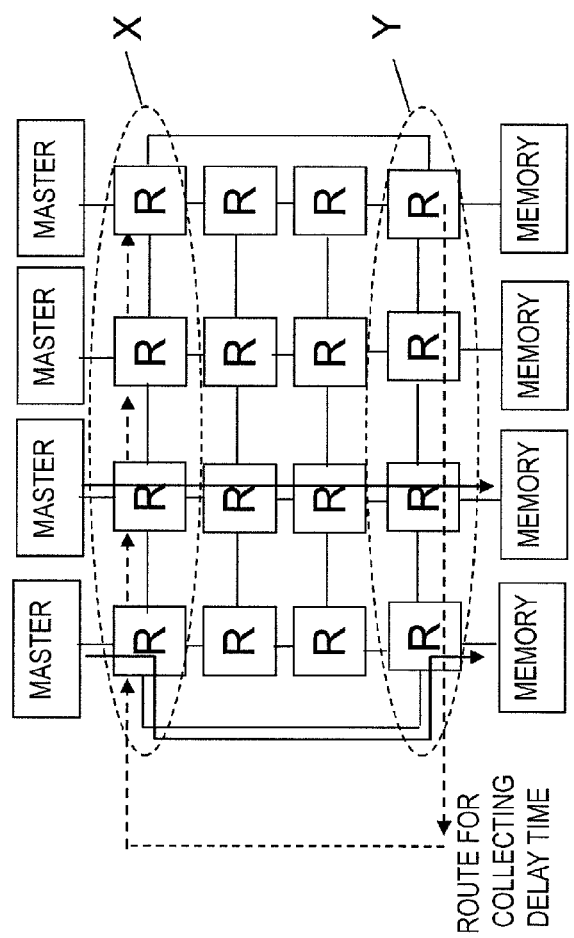

FIGS. 11A and 11B each show a structure of an NoC for realizing low latency transmission.

FIG. 11A shows an example of route selection by which a memory having a small access load and a transmission route to such a memory are selected to transmit the traffic. In the example of this figure, a transmission delay to a relay device group "X" connected to the bus masters and a transmission delay to a relay device group "Y" connected immediately before the memories are measured. The relay device group X connected to the bus masters share the information on the transmission delay time to each memory. The information on the transmission delay time is held by the delay time processor 207. When an access is made from the bus master to the memory, the low latency route selector 210 determines a memory as the access destination and a transmission route based on the obtained transmission delay time. This allows a memory and a transmission route to be determined while the memory access load is mainly reflected.

The relay device group "X" and the relay device group "Y" may be each configured of a gateway for connecting a bus master and an NoC or a gateway for connecting a memory and an NoC. Such a gateway is common in the NoC field and referred to as the "NIC (network interface controller)" or the "NI (network interface)". The access load may be independently collected by each bus master regarding each memory.

FIG. 11B shows an example of route selection by which, in the case where a relative access speed is set for each memory, traffics are classified in accordance with a traffic characteristic such as the request level for low latency, the traffic amplitude or the like, and a memory as the receiving end and a transmission route are selected to transmit the traffic. For example, a memory structure having physically different access speeds to the memories, for example, a memory structure including a relatively high-speed internal memory (e.g., cache memory) and a relatively low-speed external memory (e.g., DRAM), is assumed. For a traffic for which the request level for low latency is high, a high-speed memory is used; whereas for a traffic for which the request level for low latency is not high, a low-speed memory is used. Which memory is to accommodate a traffic of which request level for low latency may be determined at the time of designing. A traffic for which the request level for low latency is high is accommodated in a high-speed memory. A reason for this is that high responsiveness is expected to be obtained by accessing a high-speed memory.

A traffic having a drastic time-wise change of the amplitude may be accommodated in a low-speed memory. A reason for this is that it is expected that by assembling traffics having a drastic time-wise change of the amplitude, the statistical multiplexing effect of the traffics works and thus the transmission efficiency is improve and also low latency is obtained. Owing to this, a memory and a transmission route can be determined in consideration of a traffic characteristic.

Hereinafter, a method for selecting a memory and a transmission route by organically associating the delay caused by the memory access load, the delay caused in a relay device, and a traffic characteristic will be described.

Figure 12:
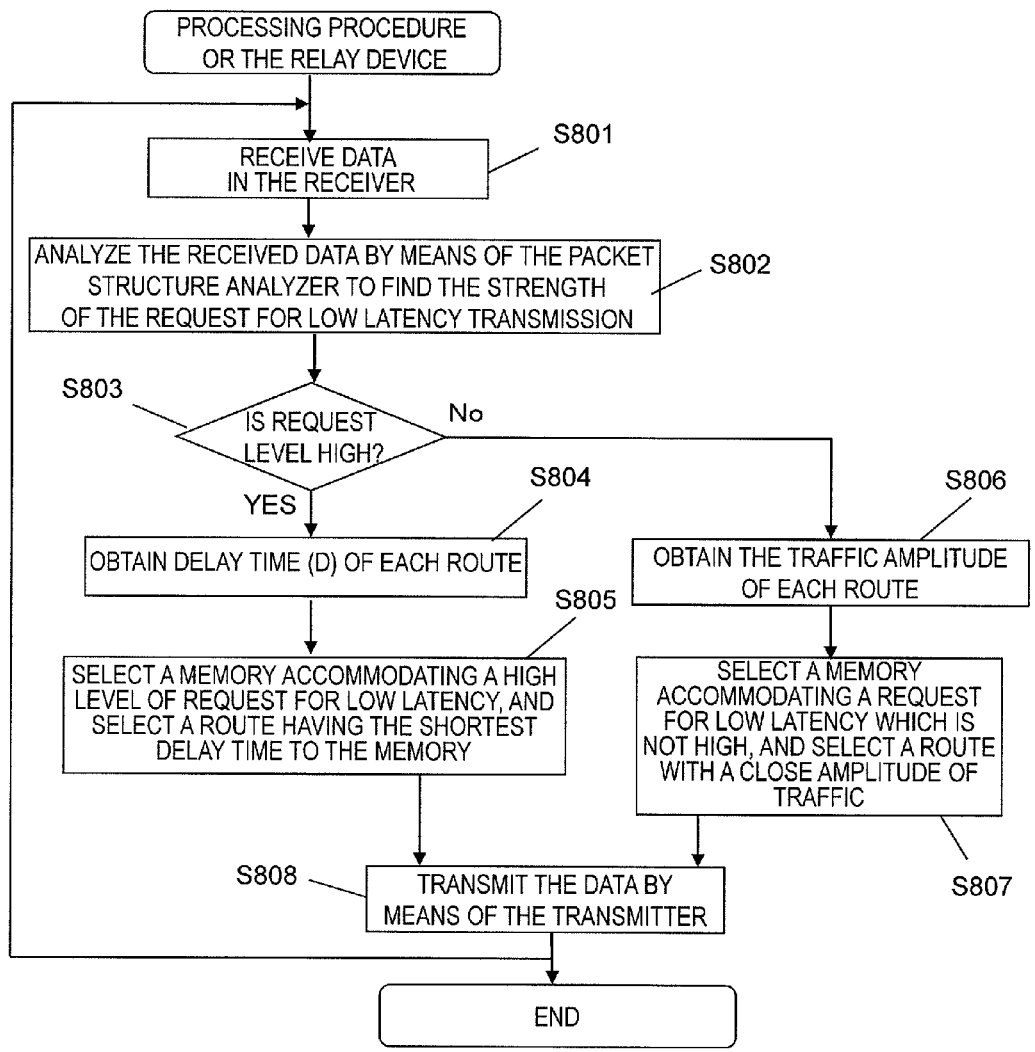
FIG. 12 is a flowchart showing a processing procedure of a relay device.

FIG. 12 is a flowchart showing a processing procedure of a relay device.

A relay device receives a flit from another relay device or a bus master and transfers the flit to a memory or a relay device in accordance with the following processing procedure.

In step S801, the receiver 201 receives data in units of flits from another relay device or a bus master. In step S802, the packet structure analyzer 203 reads a description regarding the strength of the request for low latency transmission as defined in FIG. 9 from the received data sequence in units of flits as shown in FIG. 8. In step S803, the low latency route selector 210 determines whether or not the request level for low latency is high. When the request level for low latency is determined to be high, the processing advances to step S804; whereas when the request level for low latency is determined to be low, the processing advances to step S806.

In the case where the request level for low latency is represented by a binary value, whether the request level for low latency is high or low is determined by whether the value is high or low. In the case where the request level for low latency is represented by any other type of value, whether the request level for low latency is high or low may be determined based on whether or not the level is equal to or higher than a predefined reference level (delay time).

In step S804, the low latency route selector 210 collects delay time (D) of each route. The delay time may be obtained in parallel with the above-described processing.

Regarding the routes from the bus masters to certain relay devices, which route is to be used for which processing is determined in advance by design. In this embodiment, a plurality of memories are provided. Therefore, the information on the delay time is obtained for each of the routes from the bus masters and the certain relay devices as defined by the design and also for each of the routes from the certain relay devices to relay devices directly connected to the memories.

It is described above that the routes are defined at the time of designing, but this is merely an example. Information on the routes may be dynamically constructed by a method such as adaptive routing. In the case where the information on the routes is constructed by adaptive routing, load increase or the like which is not assumed at the time of designing can be dealt with easily.

In step S805, the low latency route selector 210 selects a memory accommodating a high level of request for low latency (e.g., high-speed memory) and also selects a route having the shortest delay time to the memory. A specific method for selecting a route will be described later with reference to FIG. 13.

In step S806, the low latency route selector 210 obtains information on the amplitude of the traffic on each of the routes from the relay devices connected to the bus masters to the memories (the details of the routes will be described later with reference to FIG. 15) from the relay devices connected immediately before the memories. The information on the amplitude of the traffic may be obtained from specific relay devices on the routes. The relay devices connected immediately before the memories (maybe specific relay devices on the routes) measure the lowest receiving rate and the highest receiving rate of the received traffic and sets the difference therebetween as the amplitude of the traffic. This value, together with the delay time, is transmitted from the relay devices connected immediately before the memories (may be specific relay devices on the routes) to the relay devices connected to the bus masters. The low latency route selector 210 compares this calculated amplitude and the amplitude of the traffic transmitted from the relay devices connected to the bus masters (obtained as the information on the amplitude of the flit shown in FIG. 8), and selects a memory accommodating a request for low latency which is not of a high level (e.g., a low-speed memory) and a route, in which an amplitude of traffic and the calculated amplitude are close to each other. In step S808, the transmitter transmits the data based on the route selected in step S805 or S807.

FIG. 13 is a flowchart showing the processing procedure in step S805 shown in FIG. 12 in detail.

In this embodiment, an evaluation expression is defined in order to select a memory as the receiving end and a transmission route. The evaluation expression is defined so as to take the following into consideration: the "delay time (D) of the traffic for which low latency is requested", which is a parameter mainly reflecting the memory access load, and also the "number of relay stages (H) to the target memory" and the "data length (L) of the data as the transmission target" which influence the delay time caused by the relay processing performed by a relay device. Thus, a memory as the receiving end and a transmission route are selected.

In step S901, first, information on the delay time (D) of the traffic for which low latency is requested, information on the number of relay stages (H) to the target memory, and information on the data length (L) of the data as the transmission target are collected from a certain relay device.

The delay time (D) of the traffic for which low latency is requested, which is a parameter mainly reflecting the memory access load, is collected by the delay time processor 207 shown in FIG. 5. As shown in FIG. 11A, the delay time processor 207 of each relay device connected to a bus master collects the information on the delay time from the relay devices connected to the memories. In each of the relay devices connected to the memories, for example, information on the remaining amount the packet and the latency of the packet in the receiver 201 thereof, the buffer amount in the relay device at that time and the like is collected as delay time (i.e., access load). Alternatively, the throughput (data amount which can be processed within a certain time period or transmission rate), the jitter (fluctuation of the interval between packet arrivals) or other information representing the transmission efficiency or the transmission quality may be used as a value of memory access load. The delay time processor 207 of the relay device connected to the bus master can use at least one of the buffer amount, the latency of the packet, the throughput and the jitter of each relay device connected to each memory as a load value of this memory.

The "number of relay stages (H) to the target memory" represents the number of relay devices located before the target memory. As described above, the number of relay stages is uniquely determined based on the method of configuring the bus masters and the memories at the time of designing. Therefore, it is sufficient to provide each relay device with the information on the number of relay stages to each memory. Alternatively, in consideration of the ease of changing the system configuration, information on the number of relay stages from each relay device to each memory may be collected at one site on the system and read.

The "data length (L) of the data as the transmission target" is data determined at the time of designing, and is a basic unit of processing performed by the relay devices, the bus masters and the memories. The data processing is performed based on the data length determined at the time of designing. In consideration of the ease of changing the system configuration, information on the number of relay stages from each relay device to each memory may be collected at one site on the system and read, so that each section of the relay devices, the bus masters and the memories operates.

Instead of the "number of relay stages (H) to the target memory" and the "data length (L) of the data as the transmission target", the bus width (W) of the transmission route to the target memory may be used. In the case where buses of a plurality of types of bus widths (e.g., a bus having a bus width of 64 bits and a bus having a bus width of 128 bits) are existent to the target memory, the bus having the narrowest bus width may be adopted for the evaluation value, for example. Thus, more appropriate route selection can be adopted as the reference.

Alternatively, the bus band (B) of the transmission route to the target memory may be used. In the case where buses of a plurality of types of bus bands are existent to the target memory, the bus having the smallest bus band may be adopted for the evaluation value, for example. Thus, more appropriate route selection can be adopted as the reference. The bus band can be represented by, for example, either the operating frequency of the bus or the transmission band of the bus assignable to the traffic as the transmission target.

Like the above-described processing, in consideration of the ease of changing the system configuration, information on the number of relay stages from each relay device to each memory may be collected at one site on the system and read, so that each section of the relay devices, the bus masters and the memories operates.

In step S902, based on above-obtained information, the low latency route selector 203 performs a calculation for route selection (evaluation expression=H×L×D) and also calculates an evaluation value by the evaluation expression. Based on the evaluation value, the low latency route selector 203 determines the transfer destination.

The bus width (W) of the transmission route to the target memory and the bus band (B) of the transmission route to the target memory may be added to the evaluation expression as the evaluation items. The evaluation is performed in a similar manner.

The items of H, L, D, W, B in the evaluation expression may be weighted, so that the items to be regarded more important can be made clear for the evaluation. In the case where the expression includes addition as well as multiplication, the evaluation function can be provided by an evaluation expression with a small amount of calculation.

The method shown in FIG. 13 allows a memory and a transmission route to be selected in consideration of the memory access load and also the transmission delay caused in the relay devices.

FIG. 14 shows a specific example of evaluation values usable as reference for selecting a memory and a route.

As parameters for calculating an evaluation value, the number of relay stages (H) from the bus master to the memory, the length (L) of the packet, and the transmission delay time (D) from the bus master to the memory are used. A specific example of method for calculating an evaluation value is to multiply the parameter values.

As understood from the example of the figure, as the number of relay stages is increased, the evaluation value is raised (FIG. 14, (1)). As the data length is increased, the evaluation value is raised (FIG. 14, (2)). As the delay time is increased, the evaluation value is raised (FIG. 14, (3)). It is understood from the example of the figure that a route having a higher evaluation value is less suitable for low latency transmission. Based on the numerical values representing the request level for low latency of the flow characteristics described above, a transmission route and a memory matching the obtained evaluation value are selected. The relationship between the numerical value representing the request level for low latency and the evaluation value is determined in advance at the time of designing, and a transmission route and a memory are selected based on the relationship during the operation.

In this embodiment according to the present invention, the evaluation expression is formed by multiplication. The evaluation expression may be formed by addition, subtraction or multiplication. Any expression is usable as long as an evaluation result in accordance with the number of relay stages (H) from the bus master to the memory, the length (L) of the packet, and the transmission delay time (D) from the bus master to the memory is calculated. It is not necessary to use all the indexes, i.e., the number of all the relay stages (H), the length (L) of the packet, and the transmission delay time (D). It is sufficient as long as a memory and a transmission route can be selected using at least one index.

Figure 15:
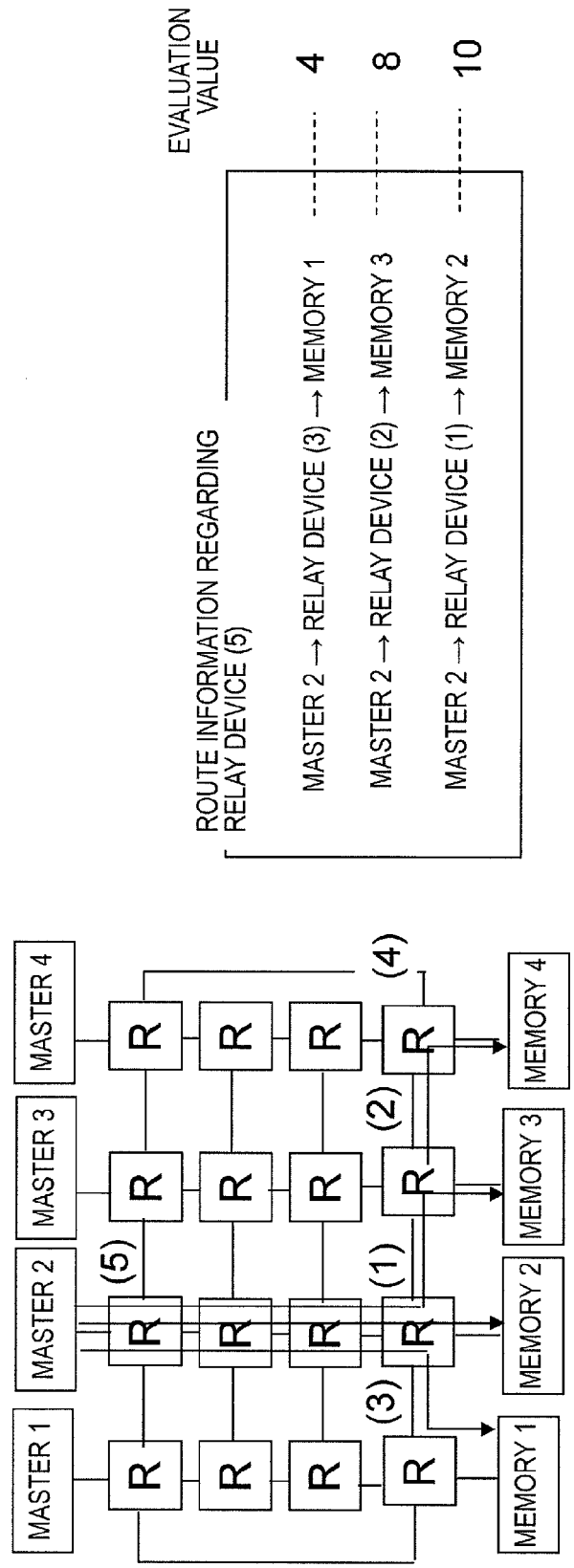
FIG. 15 shows a specific example in which a memory and a route are selected based on an evaluation value as reference for selecting a memory and a route.

FIG. 15 shows a specific example in which a memory and a route are selected based on the evaluation value, which is reference for selecting a memory and a route.

In this example, the routes from the bus masters to the memories are managed by the relay devices. The figure shows route information regarding the relay device (5) (transmission route from the master 2 to each memory). In the example of the figure (master 2 to relay device (3) to memory 1), a route is set from the master 2 via the relay device (1) to the memory 1. In the relay device (5), an evaluation value on each set route is calculated. When low latency transmission is needed, the route of "master 2 to relay device (3) to memory 1" having a low evaluation value is selected.

In the case where routes from the bus masters to the memories are determined in a fixed manner at the time of designing as in the example of the figure, the steps of implementation of the routing are not necessary, and the power consumption of the chip can be suppressed. By such a method using evaluation values, a memory and a route can be selected in consideration of both of the memory access load and the delay caused in the relay devices.

FIGS. 16(A) and 16(B) each show an example of processing of determining a memory and a route in comprehensive consideration of the evaluation values of a forward path and a return path.

In the example of the figures, the evaluation expression uses a product of the number of relay stages and the transmission delay time to calculate evaluation values. In FIG. 16, the information on the packet length is omitted.

In the example of FIG. 16(A), a route toward a memory, having a low evaluation value is selected as the forward path, and an evaluation value of a route for the return path is calculated. Then the memory and a route are determined. The route from the bus master 1 to the memory 1 (number of relay stages: 4; transmission delay time: 40; evaluation value 160) and the route from the memory 1 to the bus master 4 (number of relay stages: 7; transmission delay time: 80; evaluation value 560) are selected.

In the example of FIG. 16(B), a route and a memory are selected such that a sum of the evaluation values of the forward path and the return path is minimum. When only the forward path is considered, the access to the memory 1 is shortest (evaluation value 160). However, when the return path is also considered to decrease the sum of the evaluation values of the forward path and the return path, the memory 2 is selected instead of the memory 1. Thus, the route from the bus master 1 to the memory 2 (number of relay stages: 5; transmission delay time: 50; evaluation value 250) and the route from the memory 2 to the bus master 4 (number of relay stages: 6; transmission delay time: 50; evaluation value 300) are selected.

Between a forward path and a return path, the tendency of the transmitted traffic is different in general. For example, it is often occurs that a data transfer request (control data) from a master to a memory has a high request level for low latency and the corresponding data transfer request from the memory to the bus master has a low request level for low latency. Therefore, low latency transmission is considered to be performed more easily where the evaluation values of both of the paths are considered.

Figures 17A, 17B:
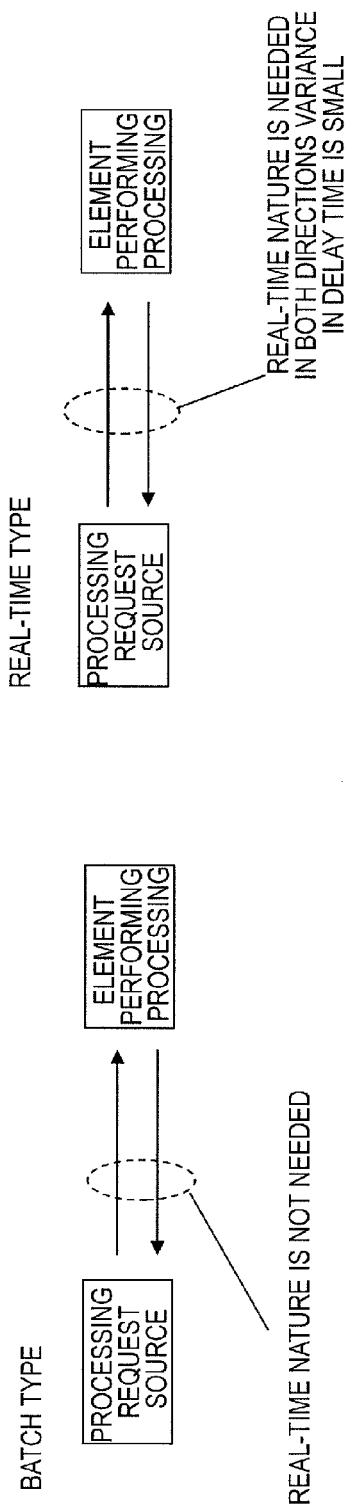
FIG. 17A shows processing types by which transmission delay requested by an application is distinguished.
FIG. 17B shows an example in which the above-described processing types are added to the flow management table shown in FIG. 9.

FIG. 17A shows processing types by which the transmission delay requested by an application is distinguished.

In connection with FIG. 17A, a method for determining a memory and a route in accordance with the difference between the characteristics of the transmission delay requested by applications will be described.

First, in order to distinguish the characteristics of the transmission delay requested by the applications, processing types are defined. In the example shown here, there are two processing types. In terms of the application, one processing type is processing having a low degree of real-time nature (batch type processing) such as, for example, image processing of a background image, and the other processing type is image processing for which the request level for low latency is high (real-time type processing), such as, for example, video streaming.

As shown in FIG. 17A, two processing types (batch type and real-time type) are assumed.

In the case of the batch type processing, a request is transmitted from a bus master as the processing request source to a memory which performs the processing. The processing result does not guarantee (does not require) the real-time nature.

In the case of the real-time type processing, the communication between the bus master as the processing request source and the memory which performs the processing is performed bi-directionally in real time. FIG. 17B shows an example in which the above-described processing types are added to the flow management table shown in FIG. 9. By distinguishing the processing types, a route and a memory can be selected flexibly in consideration of the difference between the evaluation value of the forward path and the evaluation value of the return path. In the case of the real-time processing, as shown in the example of FIG. 17B, the evaluation value of the forward path and the evaluation value of the return path need to be calculated while being distinguished from each other. In the case of the batch type processing, the return path does not need to have high responsiveness, and therefore the route can be set freely. An identifier of the processing type may be in a format which can be described in the header field 61 of the packet shown in FIG. 8, or may be described along the item which represents the request level for low latency. Owing to this, a forward path and a return path can be determined in accordance with the difference between the characteristics of the transmission delay requested by applications based on the information described in the packet. In the case where an NoC is used to execute a plurality of pieces of application software, a memory and a transmission route may be determined for each application. Different transmission routes may be determined for the forward path and the return path of each application.

Figure 18:
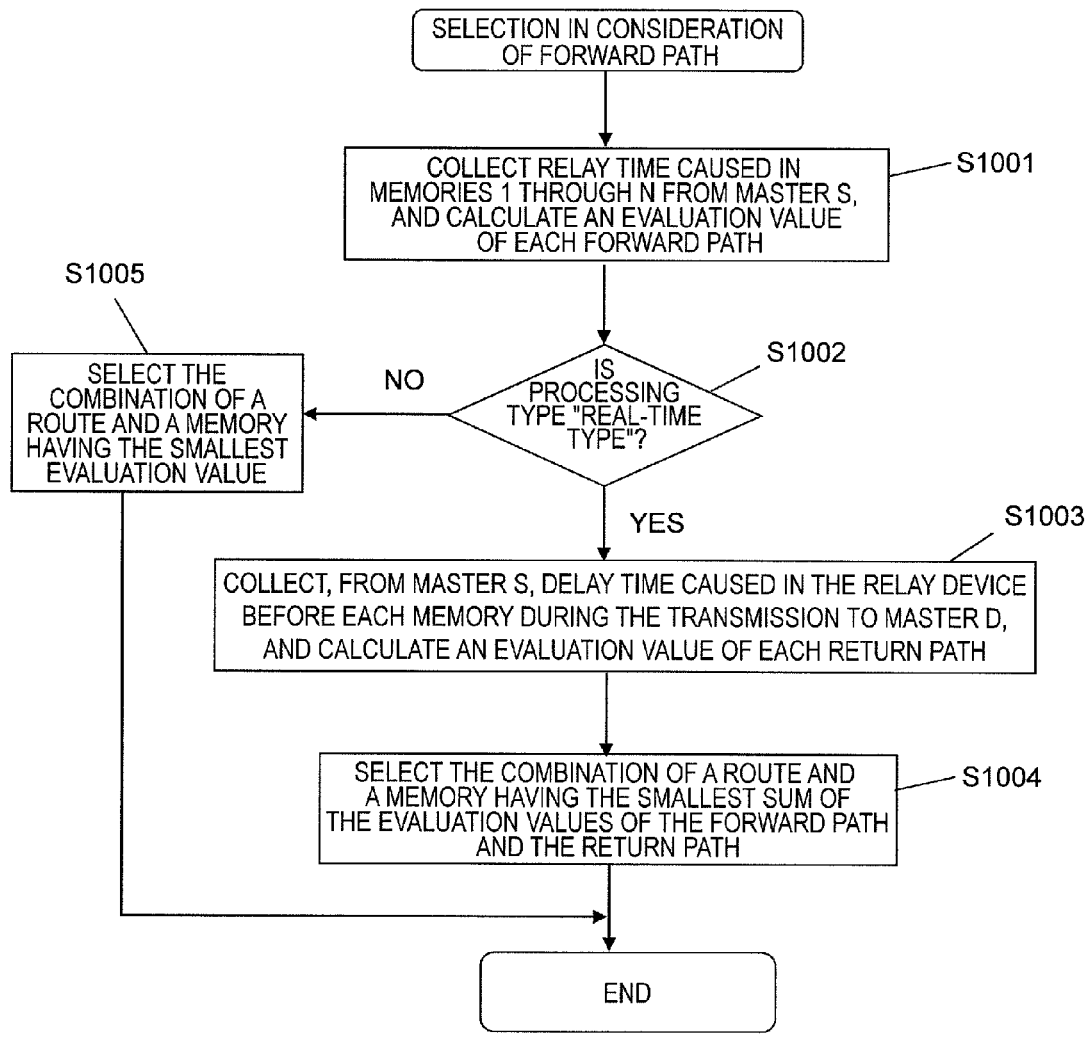
FIG. 18 is a flowchart showing a processing procedure of a method for selecting a route and a memory in consideration of the forward path.

FIG. 18 is a flowchart showing a processing procedure of a method for selecting a route and a memory in consideration of a forward path.

Based on the example of use shown in FIG. 16(A), a method for determining a memory and a route in consideration of the difference between the processing types will be described.

In step S1001, the low latency route selector 210 collects information on delay time caused in the receiver 201 of each of the relay devices accommodating the memories 1 through N from the delay time processor 207 of the master S as the transmitting end (master 1 in the example of FIG. 16). This is performed in order to estimate the processing load occurring when data is transmitted to the memories 1 through N (memories 1 through 4 in the example of FIG. 16). The low latency route selector 210 of the master S calculates an evaluation value of each forward path based on the collected delay time by the procedure shown in FIG. 13 (step S1001).

In step S1002, the low latency route selector 210 determines whether or not the processing type is the "real-time type" based on the packet analysis result obtained by the packet structure analyzer 203 of the master S. When the processing type is the real-time type, the processing advances to step S1003, whereas when the processing type is the batch type, the processing advances to step S1005.

In step S1005, the low latency route selector 210 selects a route to the memory having the lowest evaluation value of the forward path.

In step S1003, the delay time processor 207 of the master S as the transmitting end collects information on the delay time caused in the receiver 202 of each of the relay devices accommodating the memories 1 through N. Based on the collected delay time, the low latency route selector 210 of the master S calculates an evaluation value of each return path by the procedure shown in FIG. 13 (step S1003). In step S1004, the low latency route selector 210 selects the combination of a route and a memory having the smallest sum of the evaluation values of the forward path and the return path.

Figure 19:
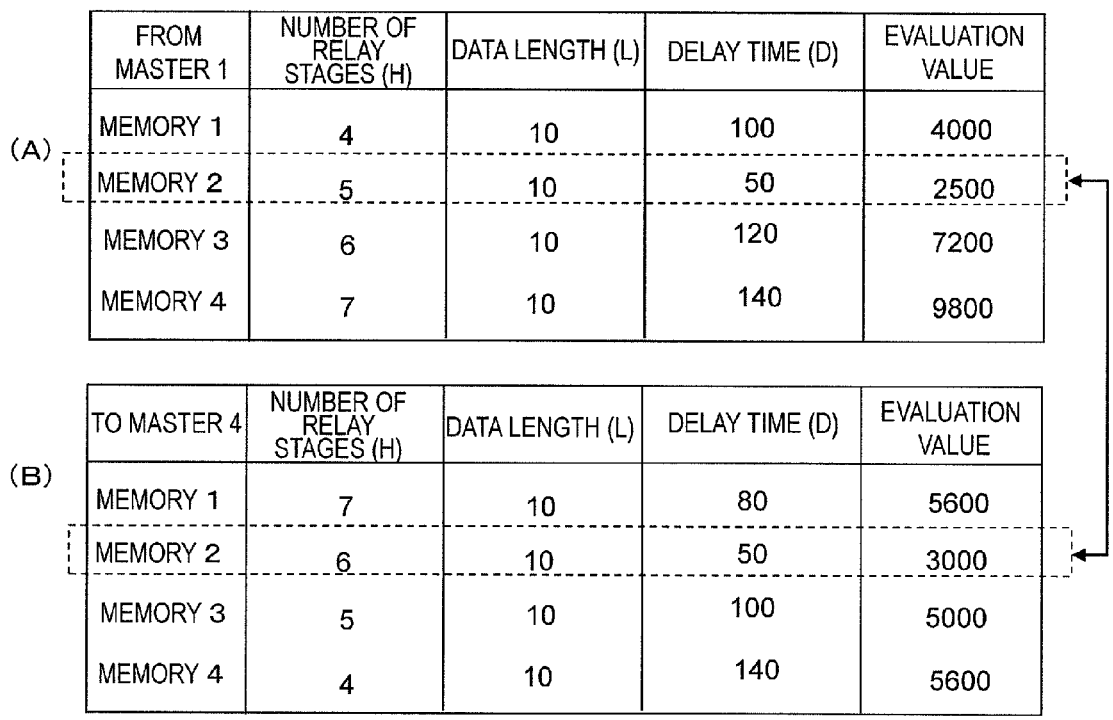
FIGS. 19(A) and 19(B) each show a specific example of evaluation values obtained in consideration of a difference between the forward path and the return path.

FIGS. 19(A) and 19(B) each show a specific example of evaluation values obtained in consideration of the difference between the forward path and the return path. This will be described based on the example of use shown in FIG. 16(A) and the structure of the relay device shown in FIG. 5.

The evaluation expression used to calculate the evaluation values shown in the figures is for calculating evaluation values based on the number of relay stages, the data length and the delay time by the procedure shown in FIG. 13.

Hereinafter, methods for obtaining and setting the parameters will be described. The number of relay stages is uniquely determined by determining the network configuration (number and locations of the relay devices, the bus masters, and the memories) at the time of designing. The data length may be determined in accordance with the type of the application or medium (e.g., video, audio, etc.) at the time of designing. The delay time is collected by the delay time processor 207 of the relay device by the procedure shown in FIG. 18. An evaluation value is calculated by the low latency route selector 210 using the obtained parameters by the method shown in FIG. 13. FIG. 19(A) shows the parameters for, and the evaluation values of, the forward paths, and FIG. 19(B) shows the parameters for, and the evaluation values of, the return paths. A memory and a transmission route are selected using these tables in accordance with the transmission quality requested by the application.

FIG. 19(A) shows the parameters (number of relay stages, data length, delay time) regarding the transmission of a packet from the master 1 to each memory, and the evaluation values.

FIG. 19(B) shows the parameters (number of relay stages, data length, delay time) regarding the transmission of a packet from each memory to the master 1, and the evaluation values. In the examples of the figures, the combination of a route and a memory having the smallest sum of the evaluation values of the forward path and the return path is selected; i.e., the memory 2 is selected.

Figure 20:
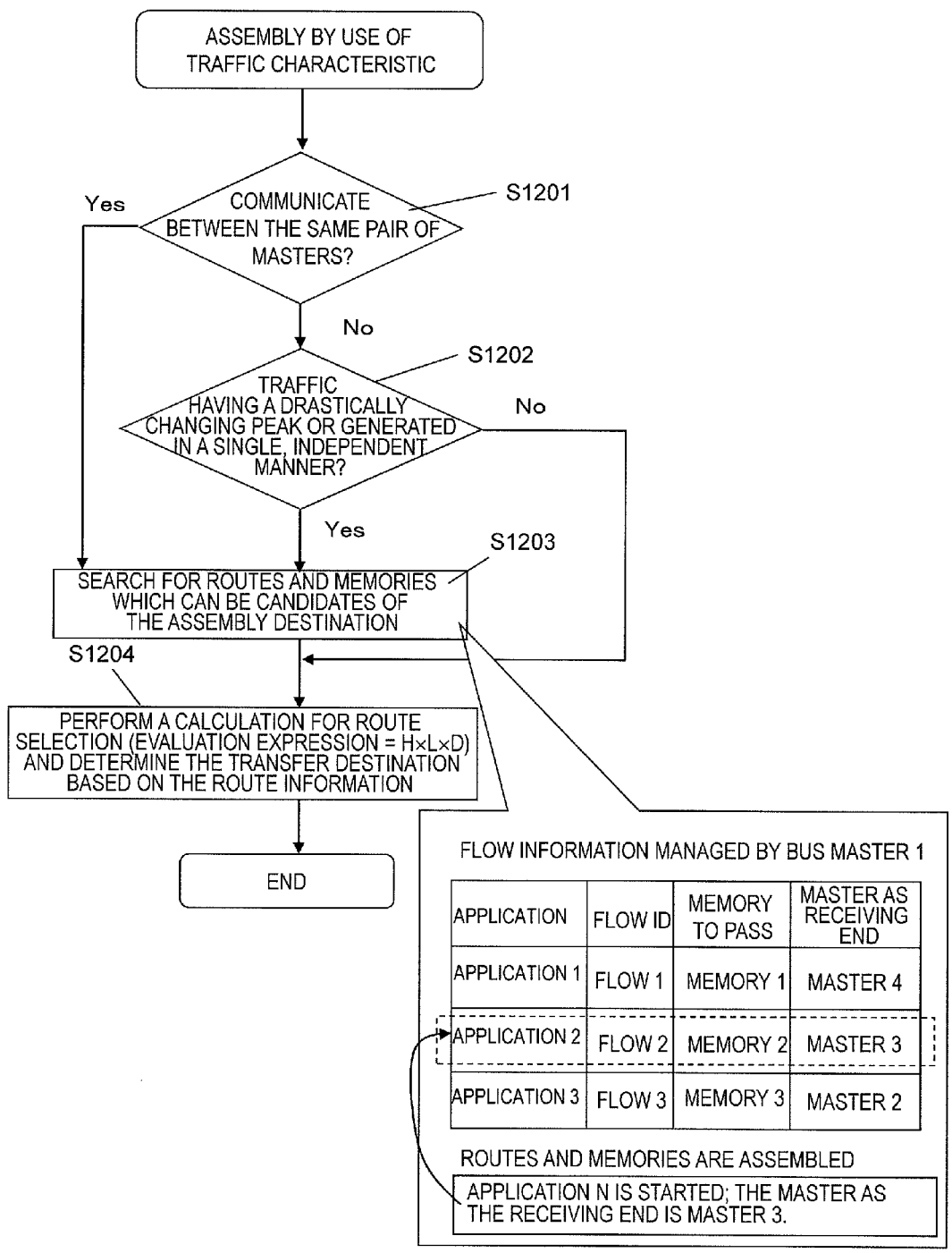
FIG. 20 is a flowchart showing a processing procedure of a method for assembling routes by use of a traffic characteristic.

FIG. 20 is a flowchart showing a processing procedure of a method for assembling routes by use of a traffic characteristic.

As a method for selecting a memory and a transmission route, a selection method by which routes are assembled by use of a traffic characteristic will be described.

Now, an example is assumed in which one, same application is divided into different processors and processed in parallel, and data is exchanged between the processors (bus masters) via memories. In the case where a plurality of traffics are existent between the processors at the same time, it is preferable to assemble the traffics such that all the traffics use the same memory. In this manner, the time and labor of management are reduced and a higher performance is expected to be guaranteed.

For the traffic characteristic, traffics having a drastically changing peak and traffics generated in a single, independent manner are assumed. Rather than transmitting such traffics on the same route as the fixed-rate traffics, it is preferable to distinguish only the traffics having a drastically changing peak or traffics generated in a single, independent manner so that the same type of traffics are assembled and transmitted on the same route. The latter case provides a better statistical multiplexing effect, and therefore is more likely to improve the transmission efficiency.

Regarding the traffic characteristic, a flow ID is provided to each traffic flow as shown in FIG. 9 at the time of designing to define the type of data, the strength of the request for low latency transmission, and the amplitude of the traffic. The traffic characteristic is not limited to the amplitude of the traffic. For example, instead of, or in addition to, the amplitude of the traffic, the packet size, the data size, the interval between traffic data arrivals, or the interval between traffic data transmissions may be defined. Use of such information clarifies the similarity among traffics.

Such information is described in the packet, and the data is transmitted from the bus master. Such information is analyzed by the packet structure analyzer 203 of each relay device connected to the bus master (e.g., "X" in FIG. 11). The low latency route selector 210 selects a memory and a transmission route based on such information.

With reference to FIG. 20, the operation of the low latency route selector 210 will be described in detail.

First, in step S1201, the low latency route selector 210 determines whether or not traffics as the targets of assembly communicate between the same pair of bus masters. The expression "communicate between the same pair of bus masters" means that the traffics are each an application operable by the same bus master, and communicate to the same bus master as the receiving end. When the traffics communicate between the same pair of bus masters, the processing advances to step S1203, and otherwise, the processing advances to step S1202.

In step S1202, it is determined whether or not each traffic has a drastically changing peak or is generated in a single, independent manner. When the traffic is such a traffic, the processing advances to step S1203, and otherwise, the processing advances to step S1204.

In step S1203, the low latency route selector 210 searches for routes and memories which can be candidates of the assembly destination, at which the traffic is to be assembled. More specifically, the low latency route selector 210 performs the search to find whether or not there is a communication of a traffic having a drastically changing peak or a traffic generated in a single, independent manner. When there is no route or memory which can be a candidate of the assembly destination, a route and a memory to be the assembly destination are determined in accordance with the evaluation values.

When there is such a candidate, in step S1204, the low latency route selector 210 finds an evaluation value of the candidate of the assembly destination and determines whether or not the candidate is appropriate as the assembly destination. Thus, the low latency route selector 210 determines a transfer destination.

The above method may be realized in real time by a semiconductor system, or alternatively may be realized by implementing the simulation result of the traffic on the semiconductor system. This is done as follows. For example, it is determined the traffics of which applications are to be assembled, or it is determined which amplitude of traffics are to be assembled. Thus, the assembly destination is determined, and the determined assembly destination is implemented on the semiconductor system.

The present invention can be embodied as a device mountable on a chip (NoC) and also as a simulation program for designing and inspecting the device so that the device is mountable on the chip. Such a simulation program is executed by a computer. In this embodiment, each of the elements shown in FIG. 4 is implemented as a class which is made an object on the simulation program. Each class reads a predefined simulation scenario to realize an operation corresponding to the respective element in the above-described embodiment on the computer. In other words, the operations corresponding to the elements are executed in a serial manner or in a parallel manner as processing steps of the computer.

The class implemented as a bus master reads the simulation scenario defined by a simulator to determine a condition, for example, the timing for virtually transmitting the packet to the class of a relay device. The class implemented as the bus master simulates the transmission state on each route and the processing in this embodiment, and performs an operation of determining a memory and a transmission route.

The class implemented as the bus master performs the operation, and thus calculates the throughput, the latency, the manner of change of the flow rate of the bus, the operating frequency, the estimated value of the power consumption and the like during the operation, and provides these to a user of the program, until the condition for terminating the simulation described in the simulation scenario is fulfilled. Based on these, the user of the program evaluates the topology or performance, and performs the design and inspection.

For example, it is common to describe, in each line of the simulation scenario, the ID of the bus master as the transmitting end, the ID of the bus master or the memory as the receiving end, the size of the packet or flit to be transmitted, the timing of transmission, and the like. In the case where a plurality of simulation scenarios are evaluated in the manner of batch processing, it can be inspected efficiently whether or not a desired performance is guaranteed in all the assumed scenarios. In the case where the performance is compared by changing the topology or the number of nodes of the bus and the locations of the processors, DSPs, memories and peripheral IOs, a network configuration most suitable to the simulation scenario can be specified. The structure of the present invention is applicable as a design and inspection tool of this embodiment. The present invention is applicable as a design and inspection tool.

The above-mentioned "node" is a concept encompassing a bus master such as a processor, a DSP and the like and a memory. In general, a relay device (router) is classified as a part of the node. However, in this specification, the relay device does not need to be encompassed in the concept of the node. A relay device according to the present invention is usable in a semiconductor system for transmitting data between a plurality of nodes such as bus masters, memories and the like.

Hence, the embodiment of the present invention can be described as follows in a more general manner. In the embodiment of the present invention, a semiconductor system is configured in which a first node, a relay device connected to the first node, and a plurality of second nodes are connected to each other via a networked communication bus. A low latency route selector of the relay device selects one set of a second node and a transmission route from combinations of the plurality of second nodes and a plurality of transmission routes, based on information on a load value of each second node and information on a load value of each transmission route. As a result, the relay device can use the selected transmission route to relay data toward the selected second node.

There are cases where it is preferable to treat the relay device as a node. For example, in the case where the system LSI is made large-scaled, the system LSI is often divided into a plurality of networks in general. In order to connect such a plurality of networks to each other, a relay device called "gateway" is used. Paying attention to a network directly connected to the relay device, the relay device has a function of transmitting data to the network and receiving data from the network. This function is equivalent to that of the bus masters and the memories described above. Accordingly, in such a case, the relay device may be treated as a "node".

A low latency transmission device according to the present invention is usable for data transmission on a system LSI. More specifically, as a representative use of the present invention, a system LSI for accessing a memory from a bus master such as a processor, an I/O device or the like is assumed. However, the present invention is not limited to being used for accessing a memory from a processor. A device according to the present invention is usable as a multi-core or graphics processor, instead of a memory, among a plurality of processors or DSPs. The present invention is also usable as a simulation program.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A semiconductor system, comprising:
   at least one first node;
   a plurality of second nodes; and
   a relay device for relaying data transmitted from the at least one first node via a networked communication bus and transmitting the data to one of the plurality of second nodes;
   wherein:
   the relay device is connected to the at least one first node;
   the relay device includes a low latency route selector for selecting a set of a second node and a transmission route from combinations of each of the plurality of second nodes and each of a plurality of transmission routes, based on information on a load value of each of the second nodes and information on a load value of each of the transmission routes; and
   the relay device uses the transmission route selected by the low latency route selector to relay the data toward the selected second node,
   wherein the low latency route selector uses at least one of a buffer amount, latency of a packet, throughput and jitter of a relay device immediately before each of the second nodes, as the load value of each of the second nodes.

2. The semiconductor system of claim 1, wherein the low latency route selector uses at least one of the number of relay stages, a data length, a bus width and a bus band as the load value of each of the transmission routes.

3. The semiconductor system of claim 1, wherein the low latency route selector selects the second node and the transmission route for which a sum of an evaluation value of a forward path between the at least one first node and the second node and an evaluation value of a return path between the at least one first node and the second node is smallest.

4. The semiconductor system of claim 1, wherein the low latency route selector assembles traffics having a drastic change of peak or generated in a single, independent manner to one, same transmission route or second node with priority.

5. The semiconductor system of claim 1, wherein the plurality of second nodes include at least one of a memory, a processor, and a digital signal processor.

6. The semiconductor system of claim 1, wherein the plurality of second nodes include a relay device for connecting a plurality of networks.

* * * * *